United States Patent [19]
Landry et al.

[11] 3,866,967
[45] Feb. 18, 1975

[54] TRUCK AIR FOILS

[76] Inventors: Robert G. Landry, 45 Rachel Blvd., Lewiston, Maine 04240; Sherman R. Jenney, 27 Rochelle St., Auburn, Maine 04210

[22] Filed: Oct. 16, 1973

[21] Appl. No.: 407,029

[52] U.S. Cl. .................. 296/1 S, 105/2 R, 105/2 B, 296/91
[51] Int. Cl. ............................................. B60j 9/04
[58] Field of Search ........... 296/1 S, 91; 224/42.1 E; 105/2 A, 2 R, 2 B; 160/59

[56] References Cited
UNITED STATES PATENTS

| | | | |
|---|---|---|---|
| 2,785,445 | 3/1957 | Phillips | 160/59 |
| 3,239,267 | 3/1966 | Reynolds | 296/1 S |
| 3,574,392 | 4/1971 | Hirano | 296/91 |
| 3,697,120 | 10/1972 | Saunders | 105/2 R |
| 3,797,879 | 3/1974 | Edwards | 296/1 S |

Primary Examiner—Robert J. Spar
Assistant Examiner—Gary Auton
Attorney, Agent, or Firm—David H. Semmes

[57] ABSTRACT

Truck air foils, more particularly air foils which serve to deflect or direct air flow normally impinging on the front of a truck or a trailer box in such a manner as to decrease wind resistance thereagainst, the air foils being adjustable to accommodate, for different sizes and configuration of trucks, tractors and trailers, and for adjustably varying the flow angle and direction of the air. The air foils can be moved to retracted storage positions to facilitate shipping, such as folded flat against a trailer box, or stored in recesses in the roof or wall thereof, and when mounted in operative air deflecting positions, do not interfere with the visibility of standard top running lights of the vehicle.

9 Claims, 5 Drawing Figures

TRUCK AIR FOILS

BACKGROUND OF THE INVENTION

The trucking industry recently has been pressed by the government, at city, state and federal levels, to cut down on air pollution. Additionally, pressure is being brought to bear in the industry to conserve fuel.

Large trucks and tractor trailer combinations are also confronted with aerodynamic problems which affect maneuverability and which, due to large frontal areas presented by the structures involved, detract from efficiency of operation.

Heretofore, attempts have been made to overcome or decrease these drawbacks by using air deflectors that mount on the roof of a cab. Such deflectors while serving a useful purpose, are not entirely satisfactory. Attempts have also been made to utilize a unit which mounts on a trailer box, but these have necessitated use of a cab deflector to make it work, at full efficiency.

If an air deflector is mounted, for example, on the roof of a cab or on the front surface or top of a trailer box, problems arise. If mounted to the roof of a cab, structural fatigue soon follows, for most cab roofs are fabricated of light gauge sheet metal and/or fiber glass, when attached to the front of a trailer box it could interfere with visibility of normal top running lights, and if the trucker ships the trailer box by rail or by ship, which is paid for by the total cubical area used by the box, the overall cubical area needed to store the box in shipment is increased with commensurately increased shipping costs without increase in cargo capacity.

BRIEF DESCRIPTION OF THE INVENTION

The present invention overcomes these drawbacks and provides a highly satisfactory solution to many of the existing problems in the trucking industry arising from air resistance encountered during operation.

Additional objects and advantages of the invention will be more readily apparent from the following detailed description of embodiments thereof when taken together with the accompanying drawings in which.

Figure 1:
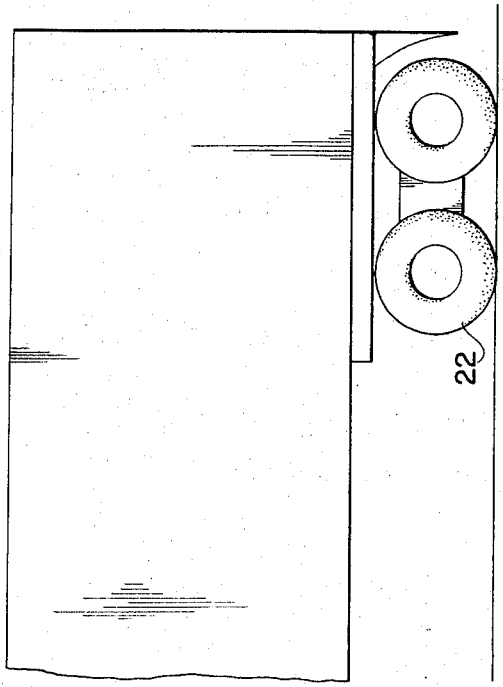
FIG. 1 is a side elevation view of a combined tractor and trailer with an air foil in accordance with the invention mounted on the trailer box.

Referring now in greater detail to the drawings, there is shown in FIG. 1 a standard type of trucking rig including a tractor generally designated 10 and a trailer 12 which includes, as is standard, a trailer box 14. The tractor has the usual running gear consisting of front wheels 16 and rear wheels 18 as also a tractor cab 20. The trailer includes rear wheels 22 and a so-called fifth wheel 24 for interconnecting the tractor and trailer. Also, as is normal, the tractor cab has running lights 26 on the top thereof and the trailer box has front running lights at 28 and side running lights at 30. These running lights must at all times be visible.

Figure 4:
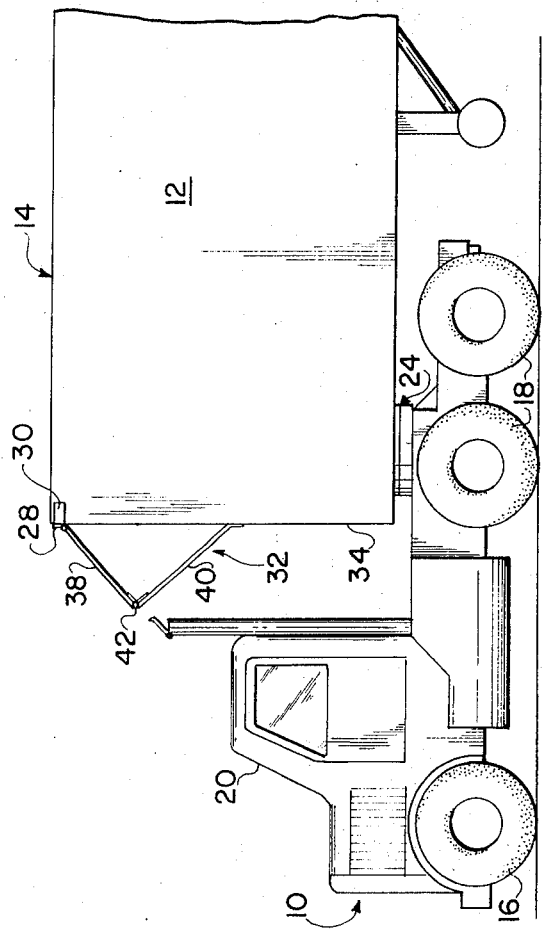
FIG. 4 is a schematic view depicting air flow when utilizing the present invention.
Figure 3:
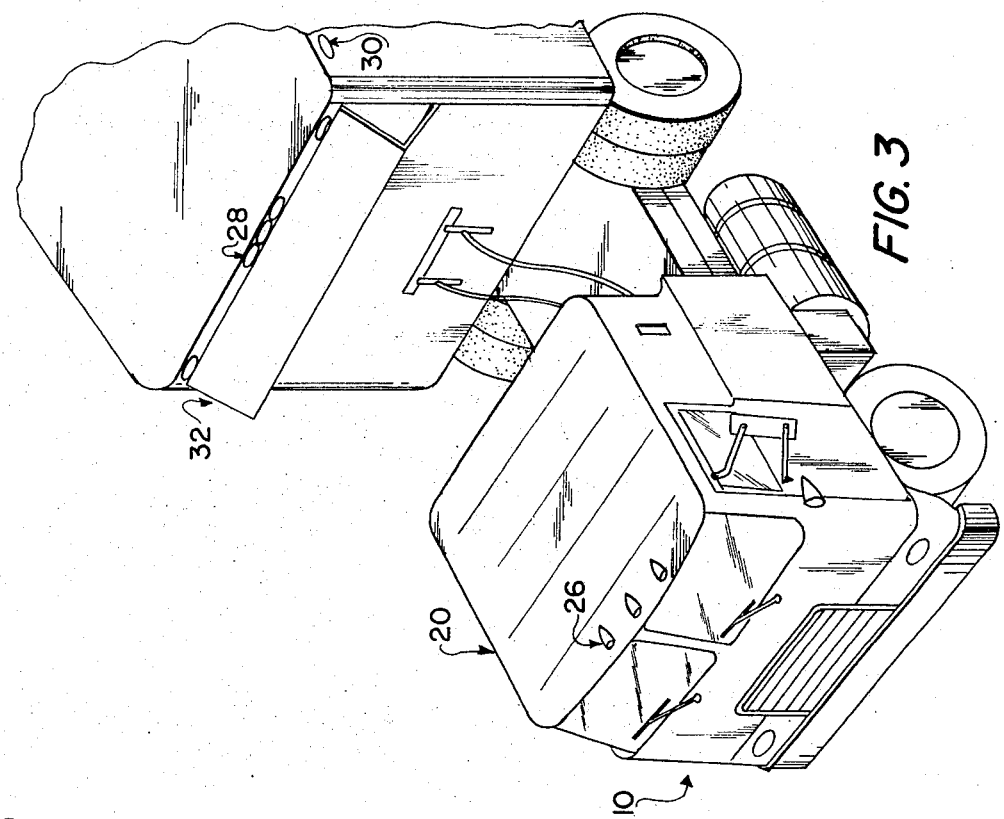
FIG. 3 is a fragementary perspective view of the combined unit of FIG. 1.

The air foil of the present invention is generally indicated at 32 and, as shown in the embodiment of FIG. 1, when mounted on the front surface 34 of the trailer box presents a generally triangular shaped frontal surface presented to the oncoming air stream or air flow schematically shown at 36 in FIG. 4.

Figure 2:
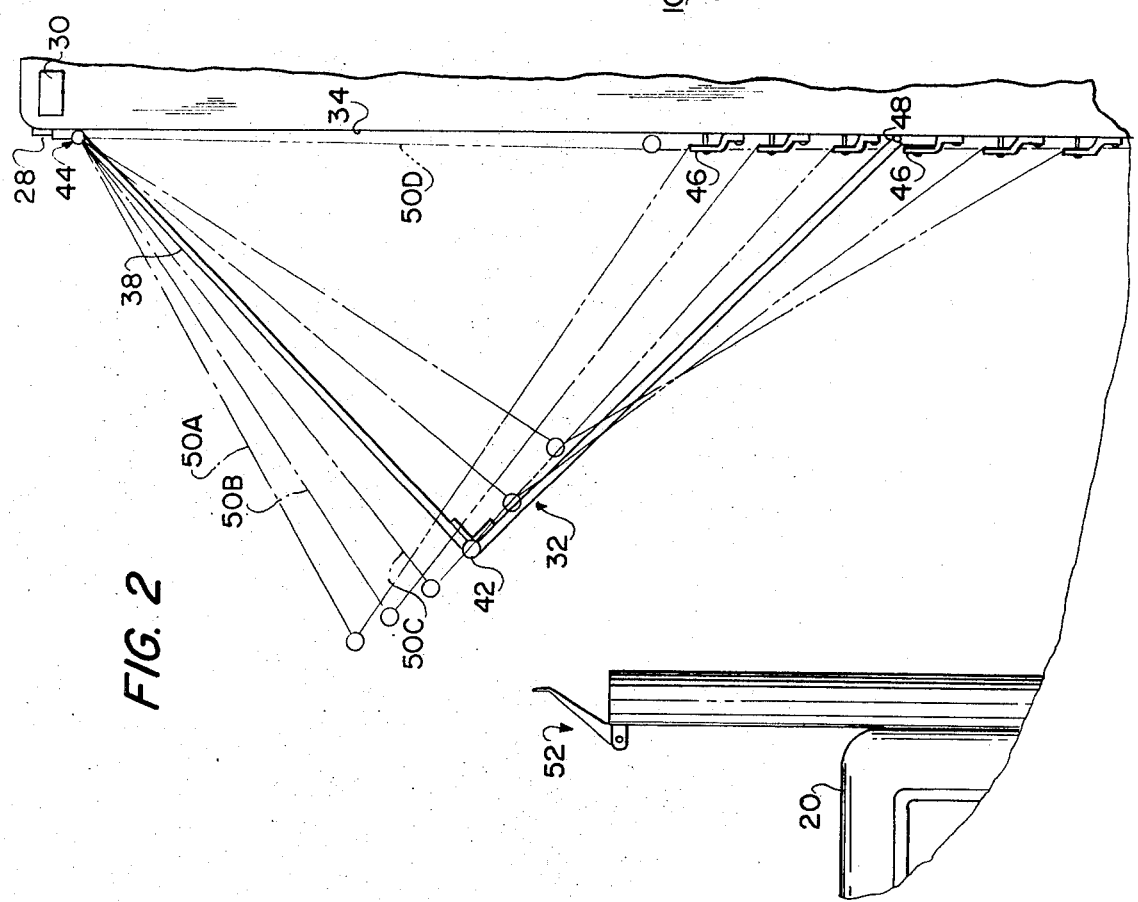
FIG. 2 is a fragmentary side elevational view of an air foil mounting in accordance with the invention which is positionally adjustable.

More specifically, the air foil 32 includes a top portion 38 and a lower or bottom portion 40 which are hingedly interconnected by hinge means 42 of any known structually usable type. Top portion 38 is hingedly mounted by hinge means 44 proximate the top of front face 34 of the trailer box. The front face of the trailer box is also provided with a plurality of securing brackets 46 which are vertically spaced and which serve as positioning and fastening brackets for the lower end 48 of lower portion 40 of the air foil. The securing brackets and the specific positioning and interconnecting mechanisms can be of any suitable structure such as pockets; pins, connections or the like. The described structure permits the air foil to assume different positions as schematically shown at 50A, 50B, 50c, etc. in FIG. 2. This adjustability feature permits the operator to adjust the air foil to cut the air stream in two or to direct more air up or down as he desires for optimum operation. It is also of significance in that the more pressure the foil receives, the greater is the force that pushes it into engagement with the positioning and fastening brackets.

An additional and important feature of the invention resides in the ability to move the air foil to a retracted inoperative position such as by folding the air foil flat against the front face of the trailer box as indicated at 50D when shipping the trailer box by rail, ship, boat or the like. Other constructions which will accomplish the same purpose can include, for example, storing the air foil in recesses in the roof or walls of the trailer box, or the sections of the air foil can be folded one on the other and encased in a boxlike container and which can additionally, if desired, form a part of the air foil construction. Other specifically different methods can be used within the broader concept of this invention. As mentioned, shipping charges are based, at least in part, on the overall length, width and height of the trailer box. The ability to retract or fold flat for shipping or for stroage provides manifest advantages in these regards. The adjustability of the air foil also permits suiting or optiminsing the air foil action as applied to different tractor heights and constructions.

It is also of substantial significance that the air foil construntion of this invention is so designed and mounted that it does not interfere with visibility of the normal running lights required by law on all large tractor trailers and trucks in the U.S.A.

The difference in the height of the truck cab roof to the ground is a factor which presents a problems. This is always changing so that the area from the top of the box to the cab roof changes. This is the most important area because the air coming over the cab roof hits the frontal surface of the trailer body or box head on. The air builds up and compresses with resultant extreme pressure being applied to the face of the box and the consequent friction builds up faster as the rig is moved faster. This requires a lot of horsepower to overcome and a lot of fuel is lost merely dragging the box through the air stream.

Figure 5:
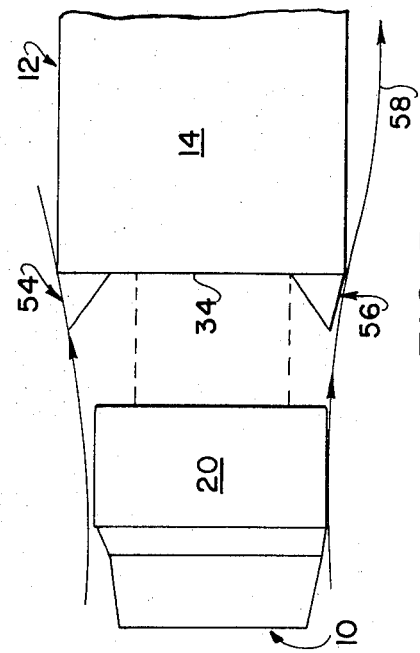
FIG. 5 is a top plan view of a modification of air foil structure and mounting in accordance with the invention.

FIG. 5 shows a form of the invention wherein two vertically mounted side foils 54 and 56 are mounted on the front face 34 of the trailer box. These side foils likewise are preferably adjustably mounted and can be used in conjunction with the horizontally mounted air foil 32, being positioned therebelow, or separately used for some constructions.

Side foils such as at 54 and 56 serve to direct air flow around the sides of the trailer box as indicated by arrows at 58 in FIG. 5, again with the express purpose of decreasing frictional forces. Such side foils, due to their positionment and adjustability also serve to accommodate different widths of tractor bodies and can additionally be used on the front surfaces of trucks for the same purposes.

In operation, the unit consisting of the horizontally mounted foil, pumps air up and down. The air over the foil is deflected over the box and the air deflected downwardly is also functionally used. The air as directed accomplishes the function of forming a boundary layer moving down the face of the box and changes the area back of the cab from a low pressure area to a high pressure area. The boundary layer serves to deflect any stray air that should impact it head on and turn it down to run with the boundary air. The high pressure area serves to prevent cross winds from hitting the face of the box head on.

The side air foils act as deflectors as air hits their outside, but act as duct walls to direct the boundary air down. This also helps to maintain the high pressure area in back of the cab. This system can be used on all box shaped vehicles pulled through air, that present a flat face to said air stream.

The bisected portions of air directed over the truck box and directed downwardly cuts drag. The air directed downwardly along the front of the box runs from top to bottom and outwardly. The foil is adjustable to change the ratio of air going over the top of the box and the air going down the front of the box. This control serves to keep in balance the area pressure.

The present invention has meritorious features and advantages among which are: saves fuel; cuts air pollution through saving of fuel; decreases maintenance on truck through decreased shifting; improves handling through improved aerodynamics; decrease driver fatigue; is adjustable by driver; folds flat for storage or is movable to stored inoperative position; does not interfere with running light visibility; improves speed and is simple to install.

While practical embodiments of the invention have been shown and described herein, manifestly minor changes in the details of the construction can be effected without departing from the spirit and scope of the invention as defined in and limited solely by the appended claims.

We claim:

1. A truck air foil mounted on the front surface of a box thereof, and the like, comprising:
   A. a generally triangular shaped air foil including:
      i. a substantially rectangularly shaped solid top portion;
      ii. a substantially rectangularly shaped solid bottom portion; and
      iii. means hingedly and adjustably interconnecting said top and bottom portions;
   B. a mounting means for said air foil including:
      i. means connecting said air foil to said box by attaching a hinge to said box and to said substantially rectangularly shaped top portion on its free edge opposite the edge hingedly and adjustably interconnecting said top and bottom portions; and,
      ii. a plurality of parrallel vertically spaced positioning brackets on said surface of said box hingedly and adjustably connecting the substantially rectangularly shaped bottom portion to said box by engaging the free edge of said bottom portion opposite the edge hingedly and adjustably interconnecting said top and bottom portions, whereby the angular configuration and position of said air foil can be adjustably varied by selectively connecting said free edge of said bottom portion to different positioning brackets on said box, and whereby said airfoils are capable of movement to a stored inoperative position with respect to said box to minimize overall box dimentions.

2. A truck air foil as claimed in claim 1 wherein said air foil is horizontally mounted on the front surface of a box.

3. A truck air foil as claimed in claim 2 and including generally triangularly shaped air foils vertically positioned on the front surface of a box proximate the side edges of the box and beneath the horizontally mounted air foil.

4. A truck air foil as claimed in claim 3 wherein said vertical air foils are mounted adjustably for varying the angular configuration and position thereof.

5. A truck air foil as claimed in claim 2 including a tractor, trailer combination, said air foil being mounted on the front surface of the box of said trailer.

6. A truck air foil as claimed in claim 5 and including generally triangularly shaped air foils vertically positioned on the front surface of a box proximate the side edges of the box and beneath the horizontally mounted air foil.

7. A truck air foil mounted on the front surface of a box thereof, and the like, comprising:
   A. a generally triangular shaped air foil including:
      i. a substantially rectangularly shaped solid first portion;
      ii. a substantially rectangularly shaped solid second portion; and,
      iii. means hingedly and adjustably interconnecting said first and second portions;
   B. mounting means for said air foil including:
      i. means connecting said air foil to said box by attaching a hinge to said box and to said substantially rectangularly shaped first portion on its free edge opposite the edge hingedly and adjustably interconnecting said first and second portion;
      ii. a plurality of parallel, spaced positioning brackets on said surface of said box hingedly and adjustably connecting the substantially rectangularly shaped second portion to said box by engaging the free edge of said second portion opposite the edge hingedly and adjustably interconnecting said first and second portions, whereby the angular configuration and position of said air foil can be adjustably varied by selectively connecting said free edge of said second portion to different positioning brackets on said box, and whereby said air foils are capable of movement to a stored inoperative position with respect to said box to minimize overall box dimensions.

8. A truck air foil as claimed in claim 7 wherein two generally triangularly shaped air foils are vertically mounted on the front surface of said box proximate the side edges thereof.

9. A truck air foil as claimed in claim 8 wherein said air vetical foils are adjustably mounted and connected whereby the angular configuration and position of said air foils can be adjustably varied.

* * * * *